3,409,949
BUCKLE AND RETRACTOR COMBINATION
Peter M. Kobrehel, Warren, and Paul Mandrik, St. Clair Shores, Mich., assignors to General Motors Corporation, Detroit, Mich.
Filed Apr. 29, 1966, Ser. No. 546,342
3 Claims. (Cl. 24—77)

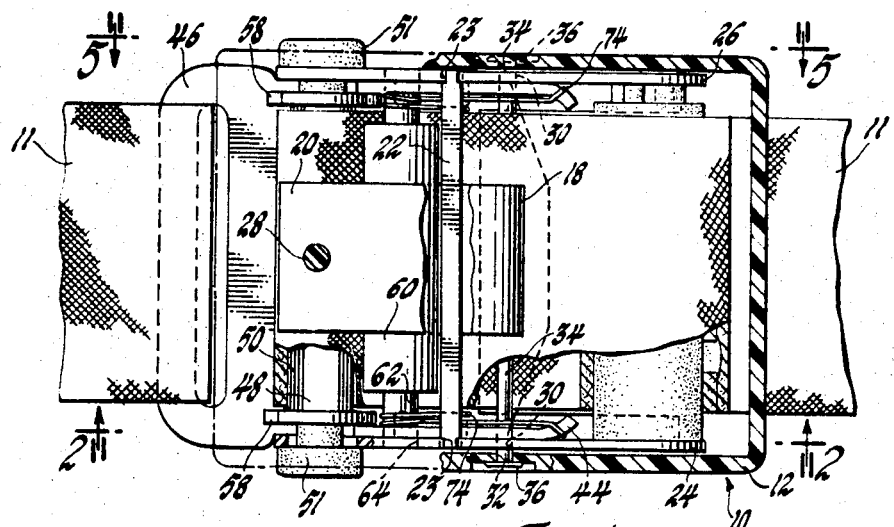
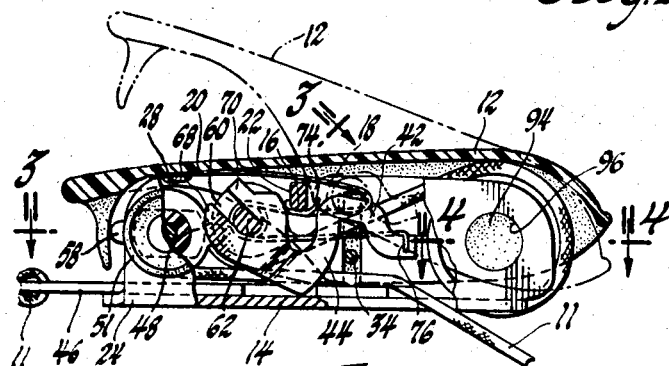
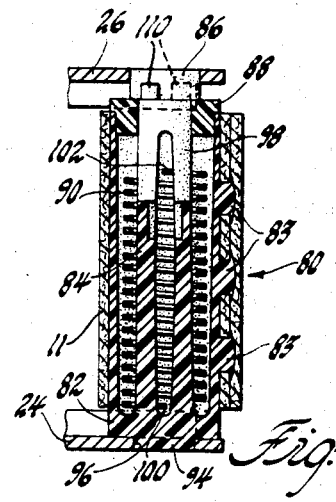
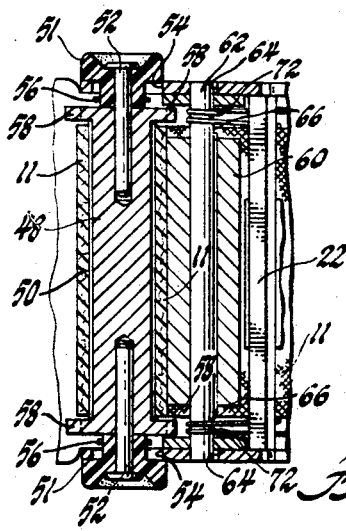
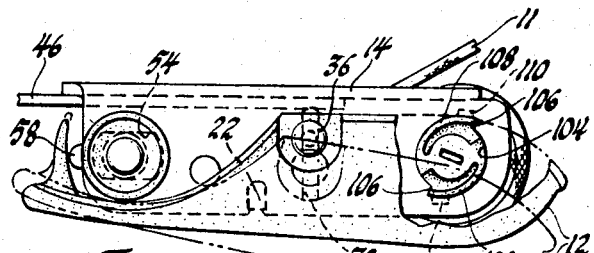

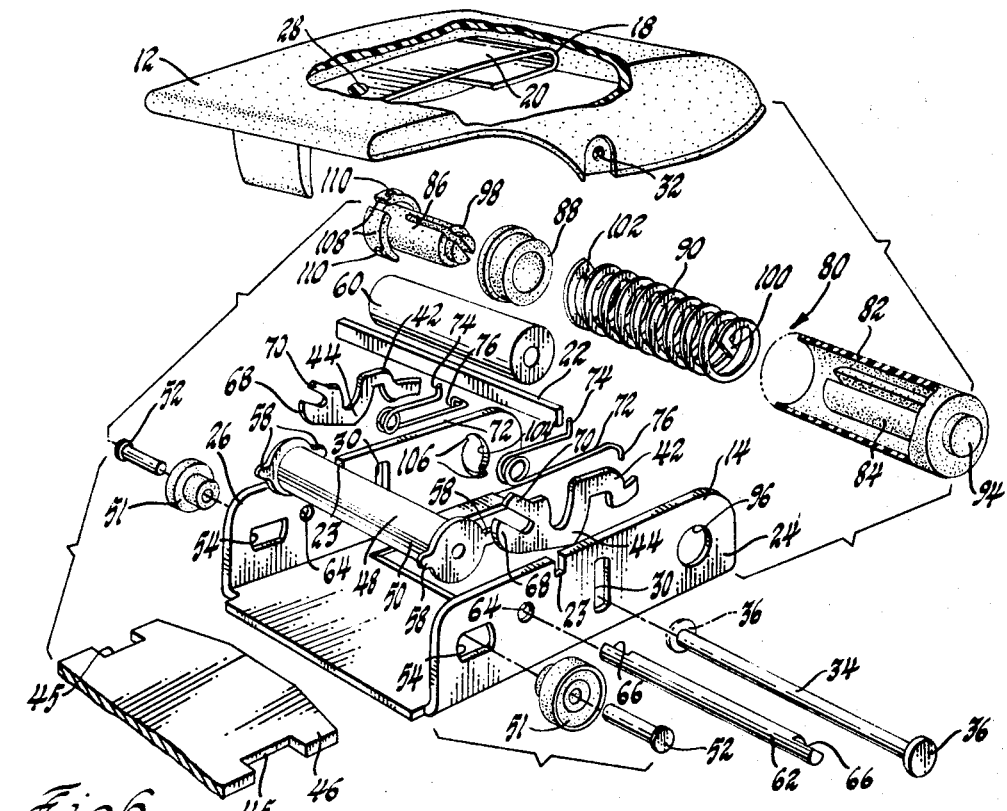
Fig. 6
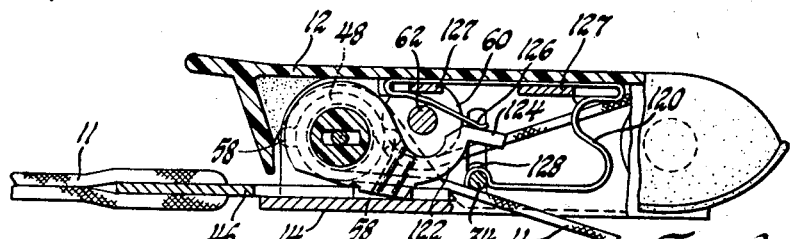
Fig. 8
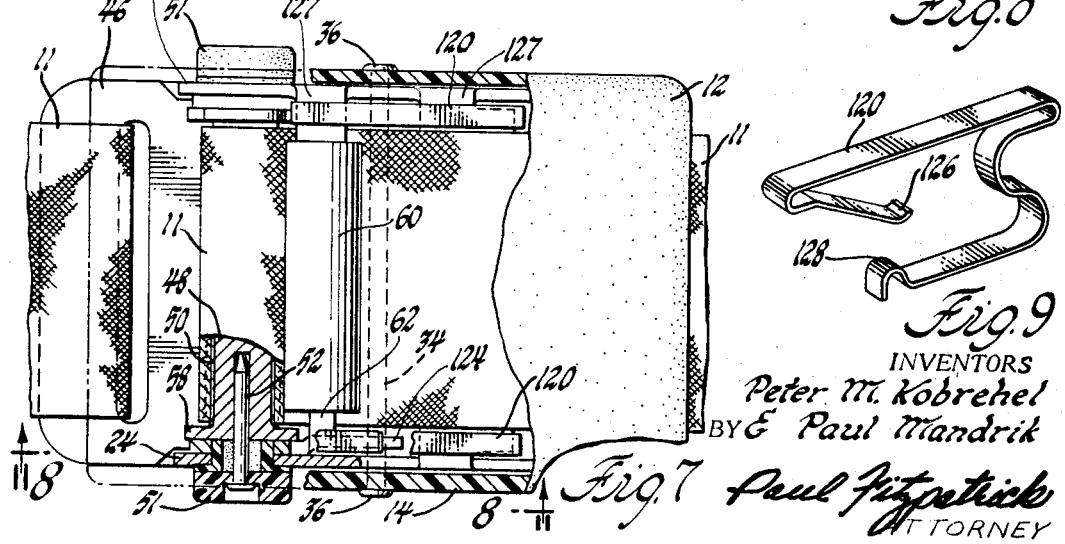
Fig. 7
Fig. 9
INVENTORS
Peter M. Kobrehel
BY & Paul Mandrik
Paul Fitzpatrick
ATTORNEY — # United States Patent Office 3,409,949
Patented Nov. 12, 1968

ABSTRACT OF THE DISCLOSURE

A combined seat belt buckle and locking retractor has a base which mounts a spring biased reel for retracting a seat belt. The belt extends from the reel, between biased-apart fixed and slidable rollers, around the slidable roller and to a vehicle body attachment. A buckle cover overlies the reel and is slidably pivoted to the frame so that it can move relative to the base to accommodate varying amounts of the belt on the reel. The cover mounts a bar for lifting a pair of locking pawls, pivoted to the base, when the cover is lifted about its pivot. A latch plate is insertable into the buckle to latchingly engage the locking pawls. Upon insertion the latch plate engages the slidable roller to prevent its rotation so that a tensile force on the belt will slide the roller until the belt is clamped between the rollers to lock the belt against movement.

---

This invention relates to safety seat belts and, more particularly, it relates to a belt retracting buckle assembly.

The use of safety seat belts in automotive vehicles has become standardized throughout the industry. Automobiles today frequently have as many as four or five sets of seat belts to accommodate a like number of passengers. The use of this many sets of seat belts provides a storage problem when the belts are not in use, as the belts are frequently left on the seats or strewn on the floor of the vehicle, thereby resulting in an untidy and unkempt appearance. To solve this storage problem many different types of seat belt retractors have been suggested and made. Most of them have been relatively complicated and expensive structures mounted on the seats or on the floor.

This invention provides a combination seat belt buckle and retractor in one relatively simple and compact unit. It eliminates the need for separate retracting mechanisms mounted on the seat or the floor and yet provides an effective means for retracting seat belts when not in use.

Other features and advantages of this invention will become obvious upon reference to the following detailed description and the drawings illustrating the preferred embodiments thereof, wherein:

FIGURE 1 is a plan view of an embodiment of the subject invention with parts broken away and in section;

FIGURE 2 is a sectional view taken in the plane of line 2—2 in FIGURE 1;

FIGURE 3 is a sectional view taken in the plane of line 3—3 in FIGURE 2;

FIGURE 4 is a sectional view taken in the plane of line 4—4 in FIGURE 3;

FIGURE 5 is a side view taken in the plane of line 5—5 in FIGURE 1;

FIGURE 6 is an exploded view of the device of FIGURE 1;

FIGURE 7 is a plan view of an alternate embodiment of the invention with parts broken away and in section;

FIGURE 8 is a side view with parts broken away and in section taken in the plane of line 8—8 in FIGURE 7; and FIGURE 9 is an axonometric view of a spring used in the FIGURE 7 embodiment.

Generally, the features of this invention include the incorporation of a retractor and buckle in a single relatively compact unit having a floating cover to accommodate retracted webbing, a roller arrangement providing both ease of adjustment and a means preventing webbing slippage through cooperation of the lock plate and the webbing holder.

More particularly, the embodiment of this invention as shown in FIGURES 1 through 6 features a combination seat belt buckle and retractor 10 used with a seat belt 11. A cover 12 and a frame 14, each substantially channel-shaped, are fastened to each other through engagement at 16 of a loop portion 18 at the free end of a leaf spring 20 with a bar 22 held at both ends in notches 23 in the side walls 24 and 26 of the frame 14. The bar 22 is held to the frame 14 by crimping the upper edges of walls 24 and 26 over the bar 22. The upper end of the spring 20 is fastened at 28 to the underside of cover 12. The frame 14 provides oppositely disposed vertical slots 30 in the side walls 24 and 26. A pin 34 passes through the slots 30 in the frame 14 and is rigidly held within apertures 32 in the cover 12 by head portions 36 at the opposite ends of the pin 34. The pin 34 passing transversely through the frame 14 and cover 12 engages arms 42 of buckle locking pawls 44 as the cover 12 is raised. The pawls 44 are thereby pivoted out of locking engagement with notches 45 in the opposite edges of a lock plate 46 to allow the lock plate 46 to be withdrawn from the buckle assembly. The lock plate 46 is connected by another segment of seat belt 11 to a fixed anchor and is adapted to cooperate with buckle 10 to hold a body within a seat in a vehicle.

As best seen in FIGURE 3, a first roller shaft 48 having a serrated periphery 50 is rotatably mounted to and transversely disposed relative to the frame 14 by stepped cylindrical fittings 51 and pins 52 received in oppositely disposed lateral slots 54 in the frame side walls 24 and 26. The cylindrical fittings 51 are held within slots 54 by snap-rings 56. Roller shaft 48 has a pair of lobes 58 at each end which prevent rotation of the roller 48 when the lock plate 46 is in position within the buckle 10. A second roller 60 is rotatably mounted to a shaft 62 transversely disposed relative to the frame 14 and rotatably mounted to the frame side walls 24 and 26 in apertures 64. The end portions of the shaft 62 are relieved at 66 to provide a D-shaped cross section to which bifurcated portions 68 and 70 of the pawls 44 are non-rotatably mounted. A pair of coil springs 72 are coaxially disposed about the opposite ends of shaft 62, one leg 74 of each spring engaging the bar 22 and the other leg 76 engaging arms 42 on the pawls 44 to bias the pawls downwardly toward a lock position.

This roller arrangement permits ease of withdrawal and retraction of the portion of the belt 11 attached to the buckle 10 when the lock plate 46 is removed, as both rollers 48 and 60 will then rotate freely. Insertion of the lock plate provides an interference with the lobes 58, thereby preventing the first roller shaft 48 from rotating. Thus, force exerted against the portion of the belt 11 attached to the buckle 10 will impart translational movement to the first roller 48 moving it towards the second roller 60 and pinching the webbing of belt 11 between the two rollers, thus isolating the occupant from tension exerted on the webbing by the retraction means indicated generally at 80 and also preventing further withdrawal of the belt.

The retractor portion 80 of the assembly includes a hollow cylindrical spool 82 which surrounds an integral slotted shaft 84, a plug 86, a cap 88 and a coil torsion spring 90. The spool 82 also has fastening buttons 83 on its periphery to engage the belt 11 as it is wrapped around the spool. The spool 82 is rotatably mounted to one side wall 24 of the frame 14 by a journal end portion 94 which fits in bearing 96. A slotted axially extending portion 98 of plug 86 fits within the spool 82 to match up with shaft 84 therein. One end 100 of the coil torsion spring 90 is received in the slot of the shaft 84 of the spool 82, and the other end 102 is received in the slot in the axially extending portion 98 of plug 86. The cap 88 fits over the portion 98 of the plug 86 and into the end of the spool 82.

As best seen in FIGURE 6, an irregular aperture 104 with oppositely disposed detents 106 is provided in the side wall 26 of the frame 14 to receive the plug 86, which has oppositely disposed pawls 108 with tabs 110. Thus, plug 86 can rotate in aperture 104 in only one direction and is restrained from rotation in the opposite direction when the detents 106 interfere with the pawls 108. The tabs 110 prevent the movement of the plug 86 completely through the aperture 104. Therefore, it can be seen that by restraining the spool 82 against rotation and rotating the plug 86 in a counterclockwise direction the coil spring 40 may be wound to any desired load and the plug is maintained in such position by the engagement of the pawls 108 with the detents 106 in aperture 104. The belt 11 extends around roller 48, between rollers 48 and 60, around 60, and then on around the spool 82, all within the buckle-retractor assembly 10. Thus, in installation the free end of the belt 11 will be secured to a floor anchor and the belt and buckle 10 inserted through the space at tht juncture of a seat and seat back. By pre-winding the spool as previously described more than the amount necessary to retract the belt and buckle to the seat back, sufficient tension will be present in the spring to hold the buckle in retracted position against the seat back.

It should also be noted that the connection between the cover 12 and the frame 14 is a floating type which allows the cover to pivot away from the frame at either end. The pin 34 can slide in slot 30 thereby providing both a pivotal and a floating connection between the cover and the frame. This feature allows for substantial movement of the cover to provide room for the belt when it is fully retracted around the spool as shown in the dashed lines in FIGURE 5. It also allows for the pivoting of one end of the cover to result in disengagement of the locking pawl with the lock plate as shown in the dashed lines in FIGURE 2.

The embodiment shown in FIGURES 7 through 9 is similar to that previously described with a few exceptions. A pair of springs 120 are used to bias the cover 12 and the buckle locking pawls, thereby eliminating the bar 22, the two torsion springs 72, and the leaf spring 20 in the embodiment of FIGURES 1 through 6. The embodiment further provides redesigned pawls 122 which require less material than the pawls 44 in the previous embodiment. The pawls 122 are rotatably mounted on cylindrical fittings 51 between the sidewalls 24 and 26 and the ends of roller shaft 48. Similarly to the previous embodiment, these pawls 122 have legs 124 which are engaged by pin 34 and pivoted out of locking engagement with the lock plate 46. The springs 120 each are bent to fit over slats 127 which extend between the sides of the frame 14. The springs 120 each further include a leg portion 126 which normally biases the locking pawls 122 into locking engagement with lock plate 46 and a leg portion 128 which normally biases the pin 34 downwardly urging the cover 12 toward the closed position.

This second embodiment (FIGURES 7 through 9) reduces the time required for assembly of the buckle-retractor combination but, in general, it operates the same as the FIGURES 1 through 6 embodiment.

Therefore, the subject invention provides in both embodiments a combination seat belt buckle and retractor which is relatively simple in construction, effective in operation, and which eliminates the necessity of a separate complicated retractor mechanism for a seat belt. It further provides a combination seat belt buckle and retractor which when connected to a mating lock plate locks the seat belt against further withdrawal and isolates the user from the effects of the retractive forces placed on the belt.

Although but two embodiments of this invention have been shown and described in detail, it should be clear to those skilled in the art to which the invention pertains that many changes and modifications may be made thereto without departing from the scope of the invention.

We claim:

1. In a seat belt buckle having latch means adapted to latchingly engage an inserted lock plate, a cover pivoted to a base for moving the latch means between latched and unlatched positions, and a spring biased reel mounted on the base for retracting and storing a seat belt, the improvement comprising:
    means positioning the cover to overlie the reel and the base and mounting the cover on the base for sliding movement relative thereto to accommodate varying amounts of belt stored on the reel, and
    locking means on the base responsive to latching engagement of the latch means and the lock plate for locking the belt against movement relative to the reel.

2. The seat belt buckle of claim 1, wherein the locking means include:
    a first clamping member fixed to the base,
    a second clamping member rotatably mounted on the base and slidable relative to the first clamping member, the belt extending from the reel between the clamping members and movably engaging the second clamping member,
    means biasing the second clamping member away from the first clamping member to enable movement of the belt to and from the reel between the clamping members when the buckle is unlatched from the lock plate, and
    cooperating means on the second clamping member and on the lock plate engageable when the lock plate is latched to the latch means to prevent rotation of the second clamping member, so that a tensile force on the belt moves the second clamping member toward the first clamping member and wedges the belt therebetween to prevent movement of the belt to and from the reel and thus lock the belt to the buckle.

3. The seat belt buckle of claim 2, wherein the cooperating means include: a pair of tabs extended radially from the second clamping member and abutment on the lock plate engageable with one of the tabs upon rotation of the second clamping member when the lock plate is latchingly engaged with the latch means, thereby preventing rotation of the second clamping member.

References Cited

UNITED STATES PATENTS

| | | | |
|---|---|---|---|
| 3,227,489 | 1/1966 | Stubblefield | 297—388 |
| 3,231,307 | 1/1966 | Smith | 297—388 |
| 3,255,502 | 6/1966 | Hollins | 24—230 |
| 3,301,593 | 1/1967 | Lamb | 297—388 |

CASMIR A. NUNBERG, *Primary Examiner.*